United States Patent
Batchelor et al.

(10) Patent No.: US 10,540,170 B2
(45) Date of Patent: Jan. 21, 2020

(54) CONCURRENT I/O ENCLOSURE FIRMWARE/FIELD-PROGRAMMABLE GATE ARRAY (FPGA) UPDATE IN A MULTI-NODE ENVIRONMENT

(71) Applicant: INTERNATIONAL BUSINESS MACHINES CORPORATION, Armonk, NY (US)

(72) Inventors: Gary W. Batchelor, Tucson, AZ (US); Veronica S. Davila, Tucson, AZ (US); Enrique Q. Garcia, Tucson, AZ (US); Robin Han, San Jose, CA (US); Jay T. Kirch, Tucson, AZ (US); Ronald D. Martens, Benson, AZ (US); Trung N. Nguyen, Vail, AZ (US); Brian A. Rinaldi, Tucson, AZ (US); Todd C. Sorenson, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/128,920

(22) Filed: Sep. 12, 2018

(65) Prior Publication Data
US 2019/0012165 A1 Jan. 10, 2019

Related U.S. Application Data

(63) Continuation of application No. 15/373,116, filed on Dec. 8, 2016, now Pat. No. 10,114,633.

(51) Int. Cl.
*G06F 9/44* (2018.01)
*G06F 8/65* (2018.01)
*H04L 29/08* (2006.01)

(52) U.S. Cl.
CPC ............ *G06F 8/65* (2013.01); *H04L 67/10* (2013.01); *H04L 67/34* (2013.01)

(58) Field of Classification Search
CPC .................................................... G06F 8/65
(Continued)

(56) References Cited

U.S. PATENT DOCUMENTS

| 6,782,492 B1* | 8/2004 | Nakaso | G06F 11/0709 |
| | | | 714/4.4 |
| 7,047,448 B2* | 5/2006 | Rao | G06F 8/65 |
| | | | 714/38.14 |

(Continued)

OTHER PUBLICATIONS

Mell et al., "Effectively and Securely Using the Cloud Computing Paradigm", dated Oct. 7, 2009, NIST, Information Technology Laboratory, Total 80 pages.

(Continued)

*Primary Examiner* — Evral E Bodden
(74) *Attorney, Agent, or Firm* — Janaki K. Davda; Konrad Raynes Davda & Victor LLP

(57) ABSTRACT

Provided are techniques for concurrent Input/Output (I/O) enclosure firmware/Field-Programmable Gate Array (FPGA) update in a multi-node environment. First notifications are sent to each I/O enclosure management engine on each of a plurality of server nodes that code activation for a first set of I/O enclosures is starting. An update image is distributed to the first set of I/O enclosures. The update image on the first set of I/O enclosures is activated by sending an activate reset command to each of the first set of I/O enclosures, wherein a reset is not propagated to other devices within each I/O enclosure in the first set of I/O enclosures in response to determining that the reset is an activate reset. In response to the activate reset command completing, second notifications are sent to each I/O enclo- (Continued)

sure management engine that code activation for the first set of I/O enclosures has completed.

15 Claims, 11 Drawing Sheets

(58) Field of Classification Search
USPC .......................................................... 717/172
See application file for complete search history.

(56) References Cited

U.S. PATENT DOCUMENTS

| | | |
|---|---|---|
| 7,228,538 B1 | 6/2007 | Burton et al. |
| 7,590,898 B2 * | 9/2009 | Coekaerts ........... G06F 11/0709 |
| | | 709/223 |
| 7,814,479 B2 | 10/2010 | Douglas et al. |
| 8,856,776 B2 | 10/2014 | Mahajan et al. |
| 8,978,025 B2 | 3/2015 | Chiu et al. |
| 9,092,297 B2 | 7/2015 | Armstrong et al. |
| 2016/0188319 A1 * | 6/2016 | Groover .................... G06F 8/65 |
| | | 717/168 |
| 2017/0171029 A1 * | 6/2017 | Maknojia .................. G06F 8/65 |
| 2018/0165082 A1 | 6/2018 | Batchelor et al. |

OTHER PUBLICATIONS

Mell et al., "The NIST Definition of Cloud Computing", dated Sep. 2011, Recommendations of the National Institute of Standards and Technology, Total 7 pages.

U.S. Appl. No. 15/373,116, pp. 40, filed Dec. 8, 2016.

Office Action dated Jan. 23, 2018, pp. 34, for U.S. Appl. No. 15/373,116.

Response dated Apr. 23, 2018, pp. 18, to Office Action dated Jan. 23, 2018, pp. 34 , for U.S. Appl. No. 15/373,116.

Notice of Allowance dated Jun. 25, 2018, pp. 8, for U.S. Appl. No. 15/373,116.

List of IBM Patents and Patent Applications Treated as Related dated Sep. 12, 2018, pp. 2.

* cited by examiner

CONCURRENT I/O ENCLOSURE FIRMWARE/FIELD-PROGRAMMABLE GATE ARRAY (FPGA) UPDATE IN A MULTI-NODE ENVIRONMENT

FIELD

Embodiments of the invention relate to concurrent Input/Output (I/O) enclosure firmware/Field-Programmable Gate Array (FPGA) update in a multi-node environment.

BACKGROUND

A server node is coupled to an I/O enclosure that includes firmware and an FPGA. An I/O enclosure may be described as the main fabric in which I/O operations are flowing through.

In high end storage and server systems that have high availability requirements, firmware and FPGA updates to critical components need to be done concurrently to meet the high availability requirements.

Thus, if the I/O enclosure is taken offline during the firmware distribution or activation of the new firmware, I/O operations may be impacted. In conventional systems, critical FPGA or firmware updates are not able to be applied to the I/O enclosure without the I/O enclosure being taken offline, such as during a repair or during an initial program load of the system. The initial program load reboots the entire system, so that access is lost to the entire system).

For example, take a system that has 8 I/O enclosures within it. The process to take 1 enclosure offline and update it can take approximately an hour. Updating 8 I/O enclosures may take almost 8 hours, which in high end servers may be too long of a service window (i.e., the update may not complete within the service window). Also, when an I/O enclosure is taken offline, and then resumed, prior to taking another I/O enclosure offline, a system administrator has to ensure that the host has switched its paths back to the first I/O enclosure in order to ensure host connectivity is not lost. This further complicates the code load process and makes it basically infeasible to concurrently update FPGA or I/O enclosure firmware.

SUMMARY

Provided is a computer program product for concurrent Input/Output (I/O) enclosure firmware/Field-Programmable Gate Array (FPGA) update in a multi-node environment. The computer program product comprises a computer readable storage medium having program code embodied therewith, the program code executable by at least one processor to perform: sending first notifications to each Input/Output (I/O) enclosure management engine on each of a plurality of server nodes that code activation for a first set of I/O enclosures is starting; distributing an update image to the first set of I/O enclosures; activating the update image on the first set of I/O enclosures by sending an activate reset command to each of the first set of I/O enclosures, wherein a reset is not propagated to other devices within each I/O enclosure in the first set of I/O enclosures in response to determining that the reset is an activate reset; and, in response to the activate reset command completing on the first set of I/O enclosures, sending second notifications to each I/O enclosure management engine on each of the server nodes that code activation for the first set of I/O enclosures has completed.

Provided is a computer system for concurrent Input/Output (I/O) enclosure firmware/Field-Programmable Gate Array (FPGA) update in a multi-node environment. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: sending first notifications to each Input/Output (I/O) enclosure management engine on each of a plurality of server nodes that code activation for a first set of I/O enclosures is starting; distributing an update image to the first set of I/O enclosures; activating the update image on the first set of I/O enclosures by sending an activate reset command to each of the first set of I/O enclosures, wherein a reset is not propagated to other devices within each I/O enclosure in the first set of I/O enclosures in response to determining that the reset is an activate reset; and, in response to the activate reset command completing on the first set of I/O enclosures, sending second notifications to each I/O enclosure management engine on each of the server nodes that code activation for the first set of I/O enclosures has completed.

Provided is a method for concurrent Input/Output (I/O) enclosure firmware/Field-Programmable Gate Array (FPGA) update in a multi-node environment. The method comprises: sending, with a processor of a computing system, first notifications to each Input/Output (I/O) enclosure management engine on each of a plurality of server nodes that code activation for a first set of I/O enclosures is starting; distributing an update image to the first set of I/O enclosures; activating the update image on the first set of I/O enclosures by sending an activate reset command to each of the first set of I/O enclosures, wherein a reset is not propagated to other devices within each I/O enclosure in the first set of I/O enclosures in response to determining that the reset is an activate reset; and, in response to the activate reset command completing on the first set of I/O enclosures, sending second notifications to each I/O enclosure management engine on each of the server nodes that code activation for the first set of I/O enclosures has completed.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide a firmware and/or FPGA update process to an I/O enclosure that keeps the I/O enclosure operational, thus I/O through the enclosure is not affected during the update. Such firmware/FPGA updates may be referred to as code updates. Also, the term "firmware/FPGA" indicates "firmware and/or FPGA".

Figure 1:
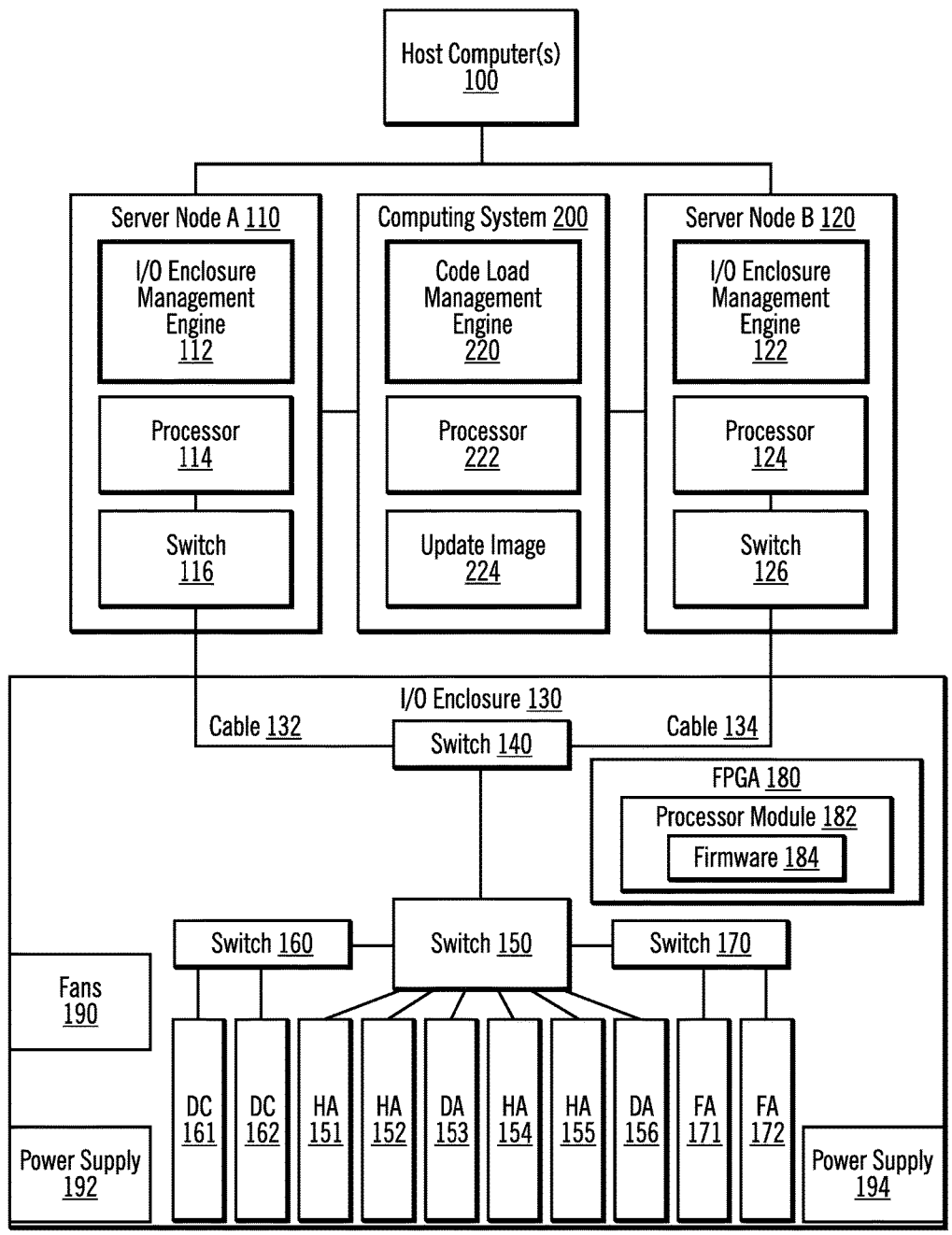
FIG. 1 illustrates, in a block diagram, an I/O enclosure in a multi-node environment in accordance with certain embodiments.

FIG. 1 illustrates, in a block diagram, an I/O enclosure in a multi-node environment in accordance with certain embodiments. One or more host computers 100 are coupled to server node A 110 and server node B 120. In various embodiments, there may be more than two server nodes. Server node A 110 and server node B 120 are coupled to an I/O enclosure 130 via cables 132, 134. In certain embodiments, these are Peripheral Component Interconnect Express (PCIe) cables. PCIe may be described as a high-speed serial computer expansion bus standard. In addition, a computing system 200 is coupled to server node A 110 and server node B 120. Computing system 200 may be any type of computing system (e.g., a laptop, another server, etc.). Computing system 200 includes code load management engine 220, processor 222, and update image 224. The code load management engine 220 may be executed by the processor 222. With embodiments, the update image contains an image file for the firmware and another image file for the FPGA. Then, one or both of the firmware and the FPGA may be updated. For example, just the firmware may be updated, just the FPGA may be updated or both the firmware and the FPGA may be updated.

In FIG. 1, one I/O enclosure 130 is shown in an expanded manner to illustrate components within the I/O enclosure 130. However, in various embodiments, there may be more than one I/O enclosure coupled to server node A 110 and server node B 120.

Server node A 110 includes I/O enclosure management engine 112, a processor 114, and a switch 116. The I/O enclosure management engine 112 may be executed by the processor 114. In certain embodiments, switch 116 is a PCIe switch (PCIe chip).

Server node B 120 includes I/O enclosure management engine 122, a processor 124, and a switch 126. The I/O enclosure management engine 122 may be executed by the processor 124. In certain embodiments, switch 126 is a PCIe switch (i.e., a PCIe chip).

The I/O enclosure 130 includes a switch 140, which is coupled to switch 150. Switch 150 is coupled to switch 160 and switch 170. Switch 150 is also coupled to Host Adapters (HAs) 151, 152, 154, and 155 and to Device Adapters (DCs) 153 and 156. Switch 160 is coupled to Host Direct Connections (DCs) 161 and 162. Switch 170 is coupled to Flash Adapters (FA) 171 and 172. In certain embodiments, switches 140, 150, 160, and 170 may be PCIe switch (i.e., PCIe chips).

The I/O enclosure 130 also includes a Field-Programmable Gate Array (FPGA) 180, which includes processor module 182. Firmware 184 executes on the processor module 182. The FPGA 180 and the processor module 182 provide I/O enclosure services, such as fan, power supply, and thermal monitoring and reporting, controls enclosure status/identify LEDs, and ability to reset switches (e.g., PCIe switches (i.e., PCIe chips)). The I/O module 130 includes fans 190, power supply 192, and power supply 194.

The I/O enclosure 130 may be described as the fabric that connects all the I/O adapters (i.e., the host adapters, the device adapters, and the Flash adapters) to the server nodes. Thus, the I/O enclosure 130 is core to I/O operations. In order to update the FPGA image file or the firmware image file for the processor module 182 within the FPGA 180, the FPGA 180 is reset. In conventional systems, when the FPGA 180 is reset, the reset would also be propagated to all the PCIe switches (i.e., PCIe chips) within the enclosure, thus impacting the I/O operations. However, with embodiments, the reset of the FPGA 180 is not driven to the other devices within the I/O enclosure. With embodiments, the other devices may include the switches, host adapters, device adapters, Flash adapters, and host direct connections.

Figure 2:
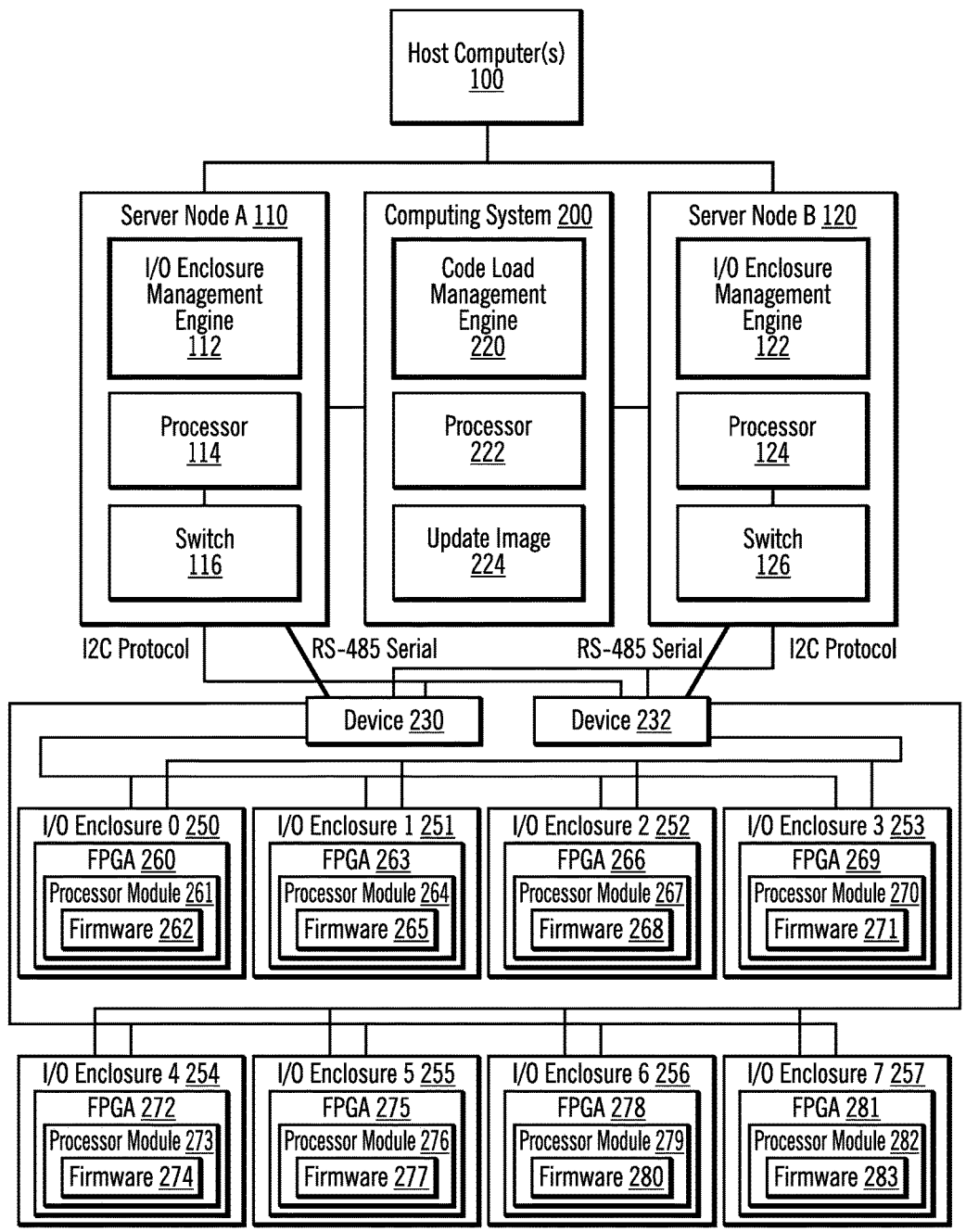
FIG. 2 illustrates, in a block diagram, multiple I/O enclosures in a multi-node environment in accordance with certain embodiments.

FIG. 2 illustrates, in a block diagram, multiple I/O enclosures in a multi-node environment in accordance with certain embodiments. In FIG. 2, one or more host computers 100 are coupled to server node A 110 and server node B 120. In addition, the computing system 200 is coupled to server node A 110 and server node B 120.

In FIG. 2, server node A 110 and server node B 120 are coupled to devices 230 and 232. In certain embodiments, the devices 230 and 232 may be Rack Power Controller 0 (RPC0) and Rack Power Controller 1 (RPC1), respectively. Server node A 110 and server node B 120 may communicate with devices 230 and 232 utilizing an I2C protocol across an I2C bus or I2C cable. Also, server node A 110 and server node B 120 may communicate with devices 230 and 232 utilizing RS-485 serial protocol, which is a standard defining the electrical characteristics of drivers and receivers for use in serial communications systems.

In FIG. 2, devices 230 and 232 are coupled to eight I/O enclosures 250, 251, 252, 253, 254, 255, 256, and 257. Each of the I/O enclosures may have all of the components of I/O enclosure 130 (FIG. 1), but only the FPGA, processor module, and firmware are illustrated for I/O enclosures 250, 251, 252, 253, 254, 255, 256, and 257 for ease of illustration and explanation. In FIG. 2, I/O enclosure 0 250 includes FPGA 260, which includes processor module 261, and which includes firmware 262. I/O enclosure 1 251 includes FPGA 263, which includes processor module 264, and which includes firmware 265. I/O enclosure 2 252 includes FPGA 266, which includes processor module 267, and which includes firmware 268. I/O enclosure 3 253 includes FPGA 269, which includes processor module 270, and which includes firmware 271. I/O enclosure 4 254 includes FPGA 272, which includes processor module 273, and which includes firmware 274. I/O enclosure 5 255 includes FPGA 275, which includes processor module 276, and which includes firmware 277. I/O enclosure 6 256 includes FPGA 278, which includes processor module 279, and which includes firmware 280. I/O enclosure 7 257 includes FPGA 281, which includes processor module 282, and which includes firmware 283.

Figure 3:
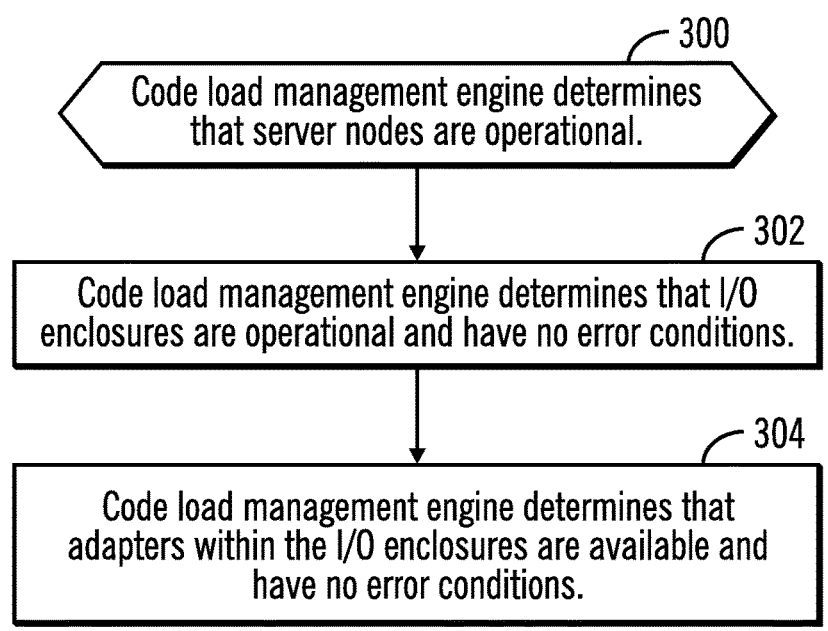
FIG. 3 illustrates, in a flow chart, operations for high level pre-checks prior to doing concurrent code load distribution in accordance with certain embodiments.

FIG. 3 illustrates, in a flow chart, operations for high level pre-checks prior to doing concurrent code load distribution in accordance with certain embodiments. These are pre-checks that are done prior to ensure that the system is in a good state before performing any updates. The term "system" here refers to the server nodes and I/O enclosures. The term "good state" refers to the components of the system being operational and ready to perform operations for distributing code and/or updating code. Control begins at block 300 with the code load management engine 220 determining that server nodes are operational. In block 302, the code load management engine 220 determines that I/O enclosures are operational and have no error conditions. In block 304, the code load management engine 220 determines that adapters within the I/O enclosures are available and have no error conditions.

Figure 4:
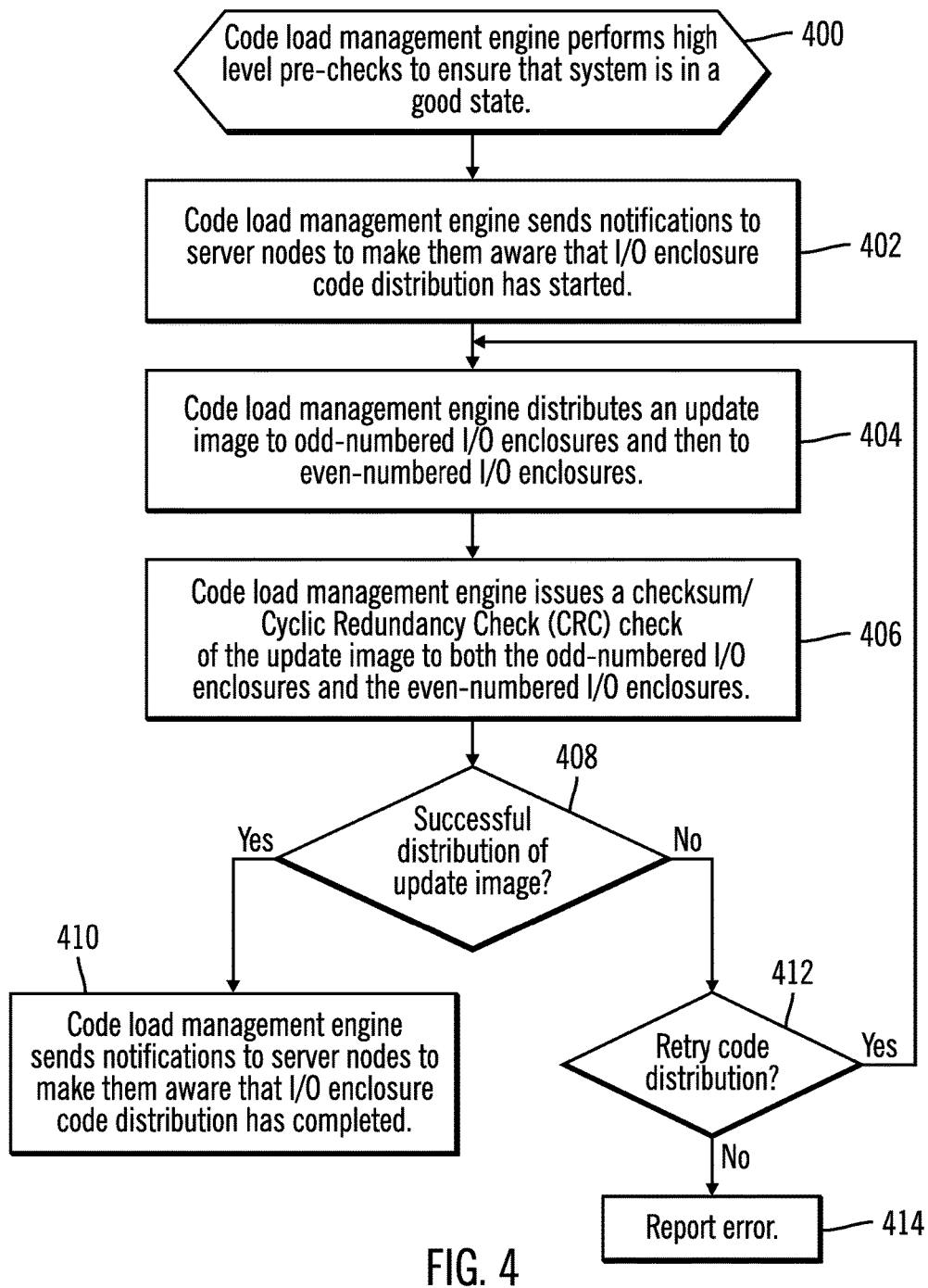
FIG. 4 illustrates, in a flow chart, operations for high level concurrent code load firmware/FPGA distribution in accordance with certain embodiments.

FIG. 4 illustrates, in a flow chart, operations for high level concurrent code load firmware/FPGA distribution in accordance with certain embodiments. Control begins at block 400 with the code load management engine 220 performing the high level pre-checks (of FIG. 3) to ensure that system is in a good state for code distribution.

In block 402, the code load management engine 220 sends notifications to the server nodes to make them aware that I/O enclosure code distribution has started. This is to allow the I/O enclosure management engine 112, 122 to make any error conditions that may come up sympathetic to the code distribution and suppress these error conditions from surfacing to the system. That is, the I/O enclosure management engine 112, 122 ignores errors that may disrupt the code activation.

In block 404, the code load management engine 220 distributes an update image to the odd-numbered I/O enclosures and then to the even-numbered I/O enclosures. The distribution of the update image may go through either server node A 110 and device 230 or through server node B 120 and device 232. The odd-numbered I/O enclosures and even-numbered I/O enclosures may provide redundancy for each other. In other embodiments, both server nodes 110, 120 and devices 230, 232 may be used to distribute the update image in parallel to increase the speed of the distribution. For instance device 230 through server node A 110 may be used to distribute the update image to the odd I/O enclosures, while device 232 through server node B 120 may be used to distribute the update image to the even I/O enclosures.

In block 406, the code load management engine 220 issues a checksum/Cyclic Redundancy Check (CRC) check of the update image to both the odd-numbered I/O enclosures and the even-numbered I/O enclosures. In certain embodiments, this is a write/read to a Flash control register.

In block 408, the code load management engine 220 determines whether the distribution of the update image was successful. With embodiments, the distribution is determined to be successful if no errors are returned from both the odd-numbered I/O enclosures and the even-numbered I/O enclosures to the code load management engine 220. If so, processing continues to block 410, otherwise, processing continues to block 412.

In block 410, the code load management engine 220 sends notifications to server nodes to make them aware that I/O enclosure code distribution has completed. That is, once code distribution is complete or no longer in progress due to error, the code load management engine 220 sends the notifications to the server nodes.

In block 412, the code load management engine 220 determines whether to retry code distribution. If so, processing loops back to block 404, otherwise, processing continues to block 412.

In block 414, the code load management engine 220 reports an error (e.g., returns an error message). If a failure occurs at any time during the code distribution, the code load management engine 220 restarts the process. In certain embodiments, the code load management engine 220 retries distribution one time, and, if it fails again, will stop and report the error. In other embodiments, the number of times to retry may be set by a system administrator.

FIGS. 5A, 5B, 5C, and 5D illustrate, in a flow chart, operations for high level concurrent code load firmware/FPGA activation in accordance with certain embodiments. Although the operations herein refer to "odd-numbered" and "even-numbered" I/O enclosures, the processing may be done to a first set and a second set of I/O enclosures that may be the odd-numbered" and "even-numbered" I/O enclosures or that may be divided in a different manner into groups.

Control begins at block 500 with the code load management engine 220 performing the high level pre-checks (of FIG. 3) to ensure that I/O enclosures are in a good state for code update.

In block 502, the code load management engine 220 sends notifications to the I/O enclosure management engine 112, 122 on each of the server nodes that code activation for the odd-numbered I/O enclosures is going to start.

In block 504, the I/O enclosure management engine 112, 122 on each of the server nodes sets a flag for each of the odd-numbered I/O enclosures indicating that the corresponding I/O enclosure is undergoing firmware/FPGA activation. That is, the flag may be set to a first value (e.g., 1) to indicate that the I/O enclosure is undergoing firmware and/or FGPA activation and may be set (or cleared) to a second value (e.g., 0) to indicate that the I/O enclosure is not undergoing firmware and/or FPGA activation. This is to allow the I/O enclosure management engine 112, 122 to make any related error conditions that may come up be code activation sympathetic and suppress these error conditions from surfacing to the system. For instance the devices 230, 232 may indicate they cannot communicate with the processor modules on the I/O enclosures during the reset. These errors need to be made sympathetic to the code activation or these errors may incorrectly be reported to the system, which may then cause the code activation to stop and lead to unnecessary repairs being performed. Also on this notification, the I/O enclosure management engine 112, 122 checks the availability conditions (e.g., all "partner" I/O enclosures are available), and, if any problems are found, then the activation is aborted.

Figure 5A:
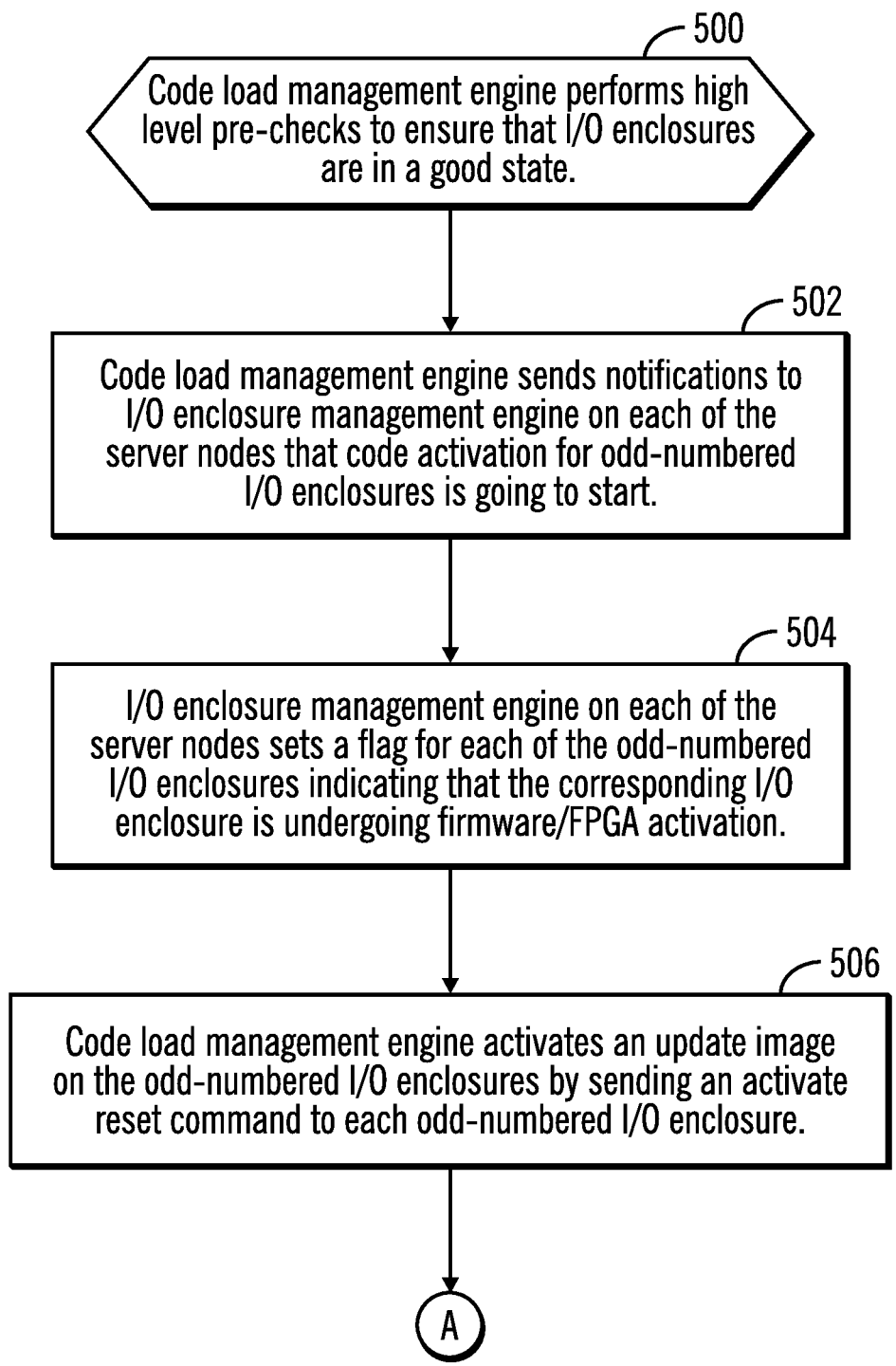
FIGS. 5A, 5B, 5C, and 5D illustrate, in a flow chart, operations for high level concurrent code load firmware/FPGA activation in accordance with certain embodiments.
Figure 5B:
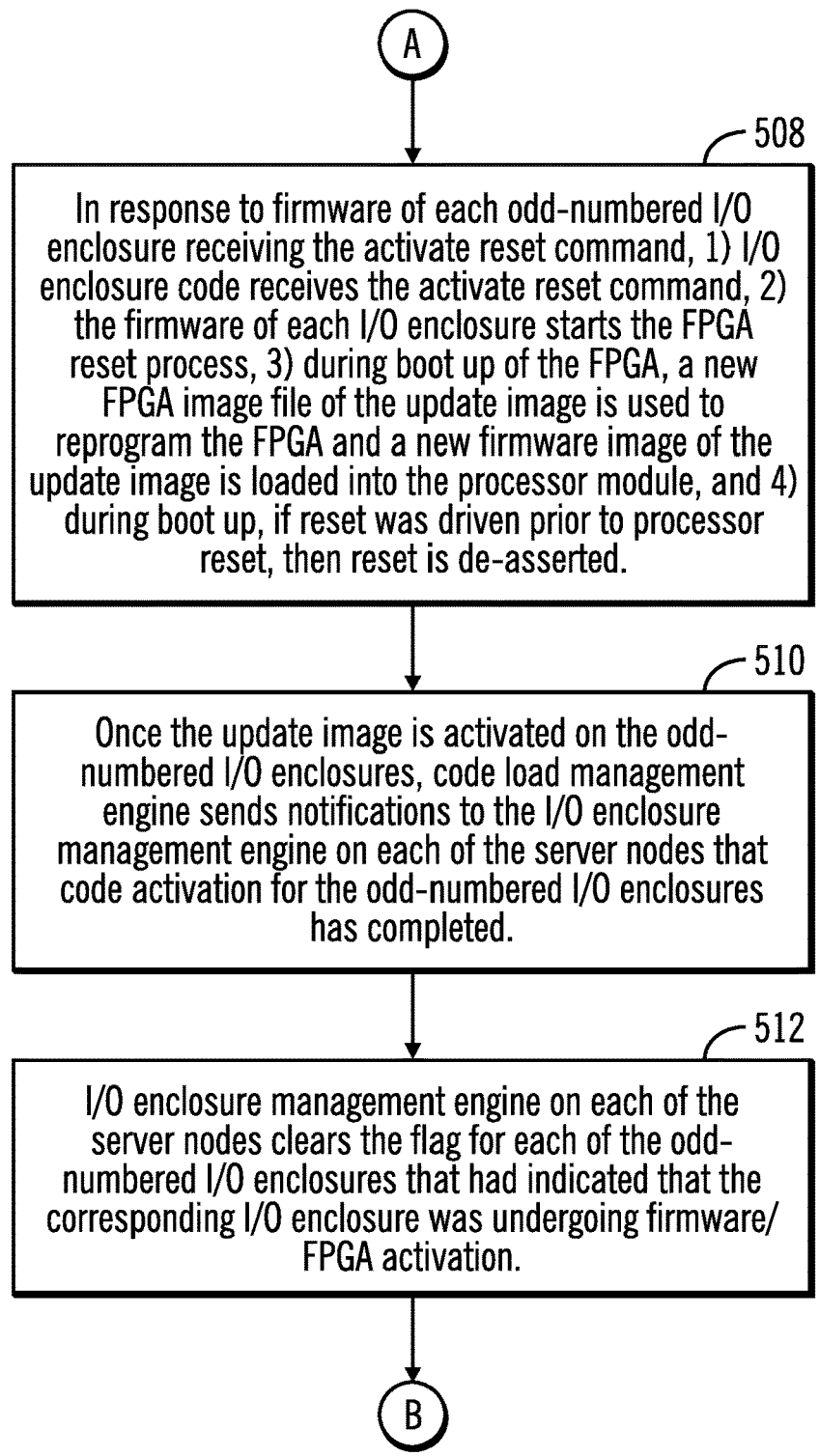

In block 506, the code load management engine 220 activates an update image on the odd-numbered I/O enclosures by sending an activate reset command (e.g., a "firmware activate reboot" command) to each odd-numbered I/O enclosure. In order to update the FPGA image file or the firmware image file for the processor module within the FPGA, the FPGA is reset with the activation of the update image. With embodiments, the reset is not propagated to other devices within each I/O enclosure in the first set of I/O enclosures. From block 506 (FIG. 5A), processing continues to block 508 (FIG. 5B).

In block 508, in response to firmware of each odd-numbered I/O enclosure receiving the activate reboot command, 1) I/O enclosure code (i.e., code within the I/O enclosure) receives the activate reset command, 2) the I/O enclosure code starts the FPGA reset process, 3) during boot up of the FPGA, a new FPGA image file of the update image is used to reprogram the FPGA and a new firmware image file of the update image is loaded into the processor module, and 5) during boot up, if reset was driven prior to processor reset, then reset is de-asserted. Note that for the I/O enclosure code starting the FPGA reset process, if this reset is not due to an activate, the reset is driven to the other devices within the I/O enclosure. If this reset is due to a activate reset command, the reset is not driven to the other devices within the I/O enclosure. The other devices include the switches, host adapters, device adapters, Flash adapters, and host direct connections. In certain embodiments, the processing of block 508 performs one of reprogramming the FGPA and loading the new firmware image into the processor module.

In block 510, once the update image is activated (i.e., the FPGA and firmware activate reset completes) on the odd-numbered I/O enclosures, the code load management engine 220 sends notifications to the I/O enclosure management engine 112, 122 on each of the server nodes that code activation for the odd-numbered I/O enclosures has completed.

Figure 5C:
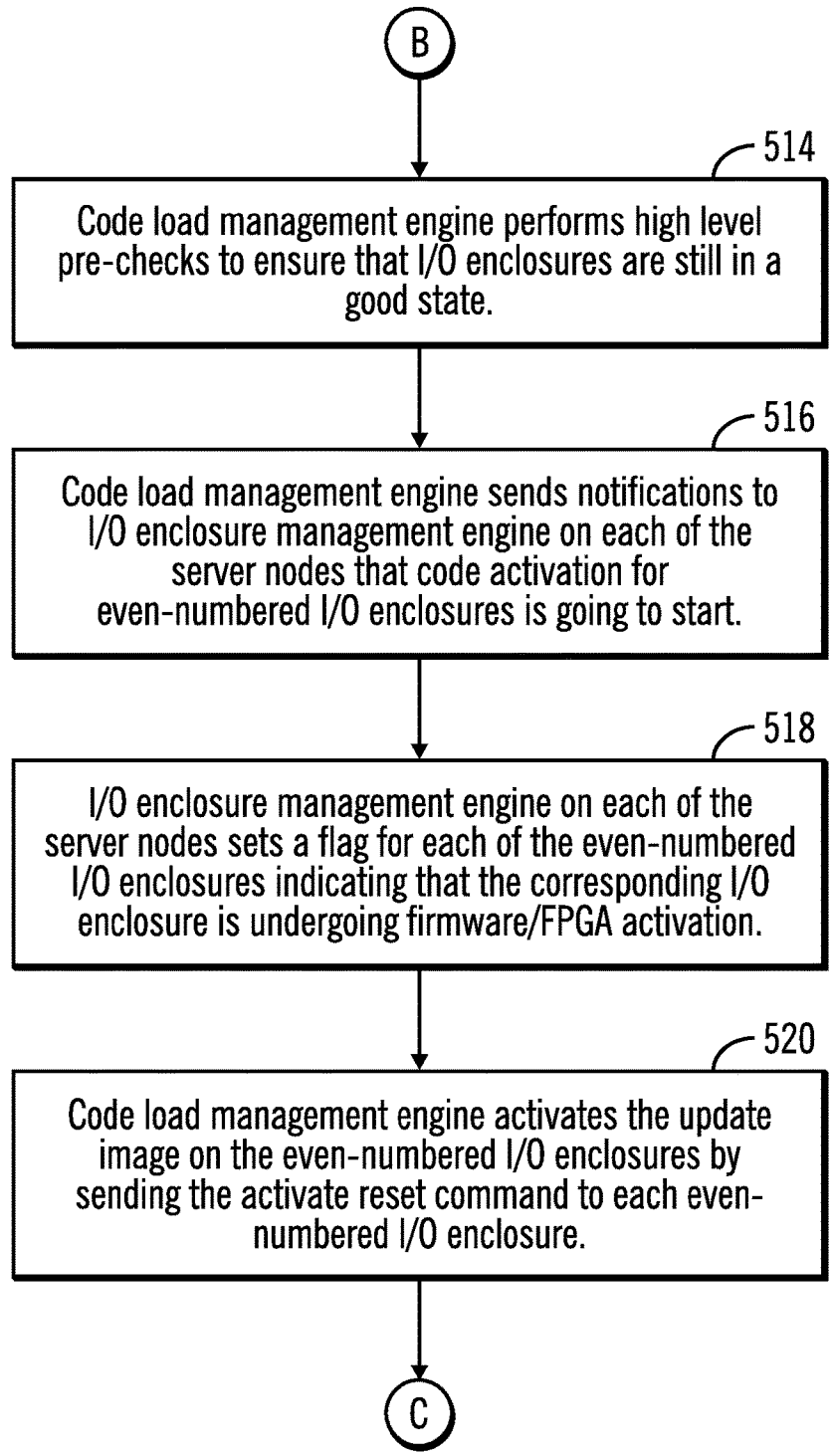

In block 512, the I/O enclosure management engine 112, 122 on each of the server nodes clears the flag for each of the odd-numbered I/O enclosures that had indicated that the corresponding I/O enclosure was undergoing firmware/FGPA activation. From block 512 (FIG. 5B), processing continues to block 514 (FIG. 5C).

In block 514, the code load management engine 220 performing the high level pre-checks (of FIG. 3) to ensure that I/O enclosures are still in a good state for code update. If any of the odd-numbered I/O enclosures have encountered an error, then the code load activation process is aborted.

In block 516, the code load management engine 220 sends notifications to the I/O enclosure management engine 112, 122 on each of the server nodes that code activation for the even-numbered I/O enclosures is going to start.

In block 518, the I/O enclosure management engine 112, 122 on each of the server nodes sets a flag for each of the even-numbered I/O enclosures indicating that the corresponding I/O enclosure is undergoing firmware/FPGA activation. This is to allow the I/O enclosure management engine 112, 122 to make any related error conditions that may come up be code activation sympathetic and suppress these error conditions from surfacing to the system. For instance the devices 230, 232 may indicate they cannot communicate to the processor modules on the I/O enclosures during the reset. These errors need to be made sympathetic to the code activation or these errors may incorrectly be reported to the system, which may then cause the code activation to stop and lead to unnecessary repairs being performed. Also on this notification, the I/O enclosure management engine 112, 122 checks the availability conditions (e.g., all "partner" I/O enclosures are available), and, if any problems are found, then the activation is aborted.

Figure 5D:
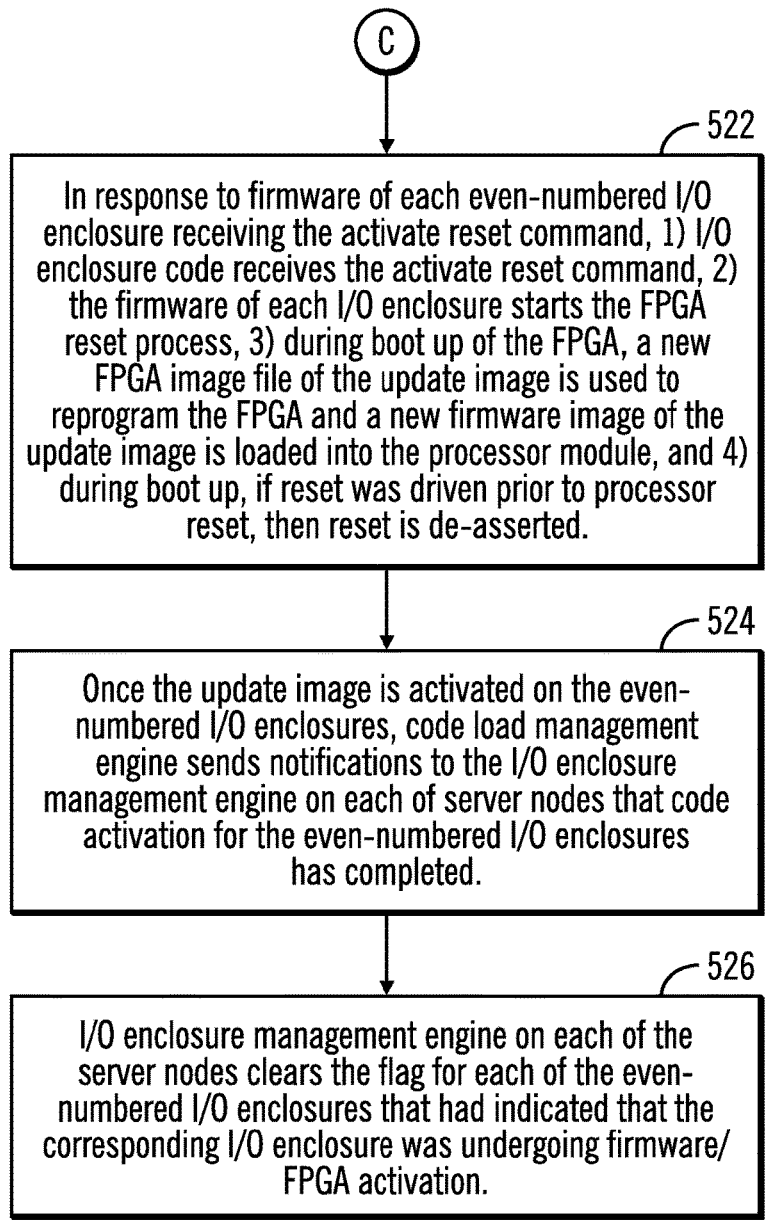

In block 520, the code load management engine 220 activates an update image on the even-numbered I/O enclosures by sending the activate reboot command to each even-numbered I/O enclosure. In order to update the FPGA image file or the firmware image file for the processor module within the FPGA, the FPGA is reset with the activation of the update image. With embodiments, the reset is not propagated to other devices within each I/O enclosure in the first set of I/O enclosures. From block 520 (FIG. 5C), processing continues to block 522 (FIG. 5D).

In block 522, in response to firmware of each even-numbered I/O enclosure receiving the activate reboot command, 1) I/O enclosure code (i.e., code within the I/O enclosure) receives the activate reset command, 2) the I/O enclosure code starts the FPGA reset process, 3) during boot up of the FPGA, the new FPGA image file of the update image is used to reprogram the FPGA and the new firmware image file of the update image is loaded into the processor module, and 5) during boot up, if reset was driven prior to processor reset, then reset is de-asserted. Note that for the I/O enclosure code starting the FPGA reset process, if this reset is not due to an activate, the reset is driven to the other devices within the I/O enclosure. If this reset is due to the activate reset command, the reset is not driven to the other devices within the I/O enclosure. The other devices include the switches, host adapters, device adapters, Flash adapters, and host direct connections. In certain embodiments, the processing of block 522 performs one of reprogramming the FGPA and loading the new firmware image into the processor module.

In block 524, once the update image is activated (i.e., the FPGA and firmware activate reset completes) on the even-numbered I/O enclosures, the code load management engine 220 sends notifications to the I/O enclosure management engine 112, 122 on each of the server nodes that code activation for the even-numbered I/O enclosures has completed.

In block 526, the I/O enclosure management engine 112, 122 on each of the server nodes clears the flag for each of the even-numbered I/O enclosures that had indicated that the corresponding I/O enclosure was undergoing firmware/FPGA activation. From block 512 (FIG. 5B), processing continues to block 514 (FIG. 5C).

With reference to blocks 508 and 522, if there is not an activate reset, then 1) reset is driven to other devices, and then 2) the reset of the FPGA is done. This is at the hardware level driving physical reset lines. So, the hardware is setup to drive physical reset lines to the other devices, and then the reset of the FPGA is done. On processor boot up, the firmware sets the hardware to clear the reset of the other devices regardless of whether a reset was done prior to the FPGA reset. With embodiments, the decision to reset the other devices is made prior to resetting the firmware/FPGA, because, when the firmware/FPGA resets, it loses the knowledge as to whether or not a reset of the other devices is needed. Thus, embodiments decide whether or not to drive the reset lines prior to reset based on whether an activate reset is being done. Thus, a reset is not propagated to other devices within each I/O enclosure in response to determining that the reset is an activate reset.

Embodiments update the I/O enclosures in such a way that I/O traffic within the enclosure is not affected.

Embodiments provide a code update for I/O enclosures by: communicating that a code update is to occur, suppressing input requests that may interfere with the code update, providing code and updating the devices in a desired pattern, notifying that code load resets are to occur to distinguish over other types of resets to enable suppressing resets of other devices within the I/O enclosure, while resetting the firmware/FPGA. That is, with embodiments, the code load management engine locks an interface such that messages (input requests) to the I/O enclosure that may affect the firmware/FPGA update are prevented from reaching the I/O enclosure (i.e., they are blocked).

Embodiments provide for concurrently updating I/O firmware images (or FPGA images) for processor modules of I/O enclosures in a multi-node environment, without taking the I/O enclosures offline (i.e., keeping the I/O enclosures functional). Embodiments provide code updates (I/O firmware images or FPGA images) through server nodes that control the I/O enclosures. Embodiments utilize a flag indicating a corresponding I/O enclosure is about to undergo the code update and suppress input requests that may interfere with the code update for the corresponding I/O enclosure.

Embodiments preload the reset condition in preparation for the reboot of the firmware/FPGA. Embodiments update the firmware/FPGA of an I/O enclosure without resetting the PCI chips within the enclosure.

Figure 6:
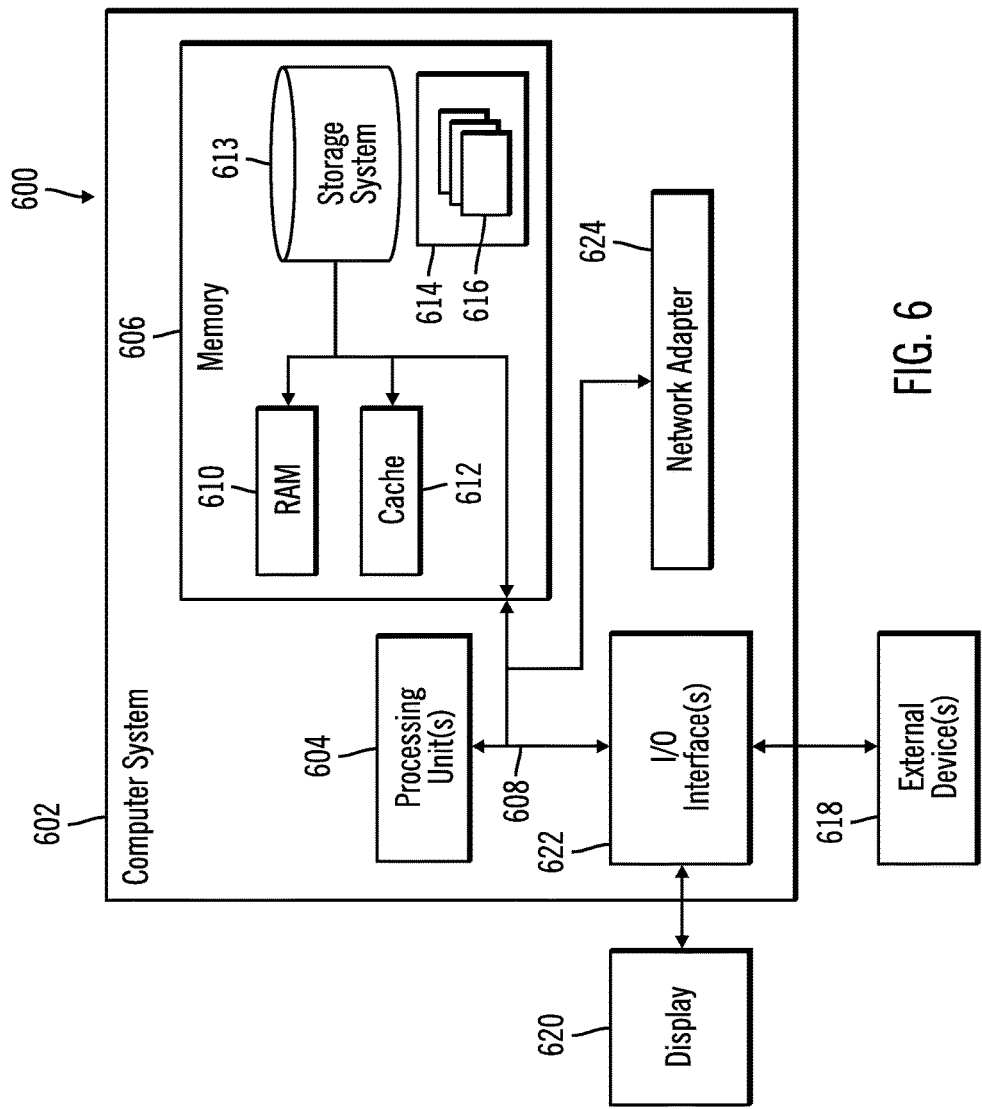
FIG. 6 illustrates a computing architecture in which the components of FIG. 1 may be implemented.

FIG. 6 illustrates a computing architecture in which the components of FIG. 1 may be implemented. In certain embodiments, the server nodes 110, 120 and/or the computing system 200 may implement computer architecture 600.

Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
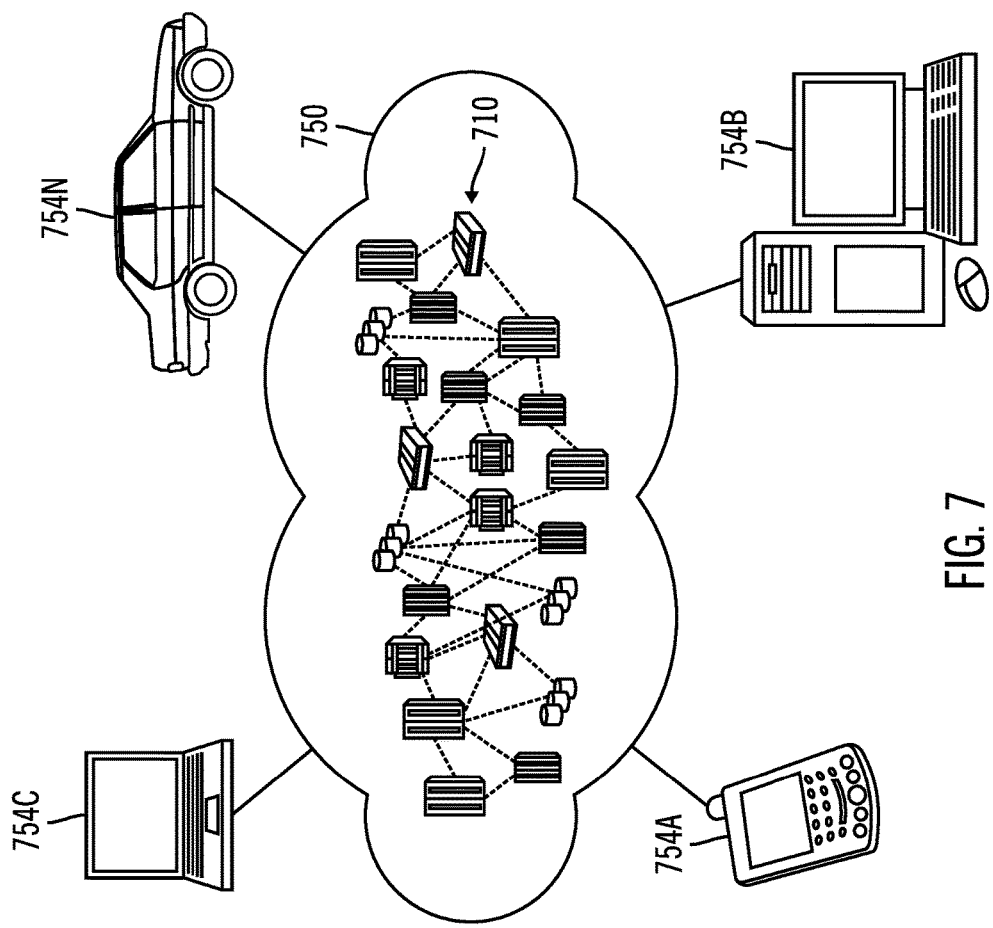
FIG. 7 illustrates a cloud computing environment according to an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
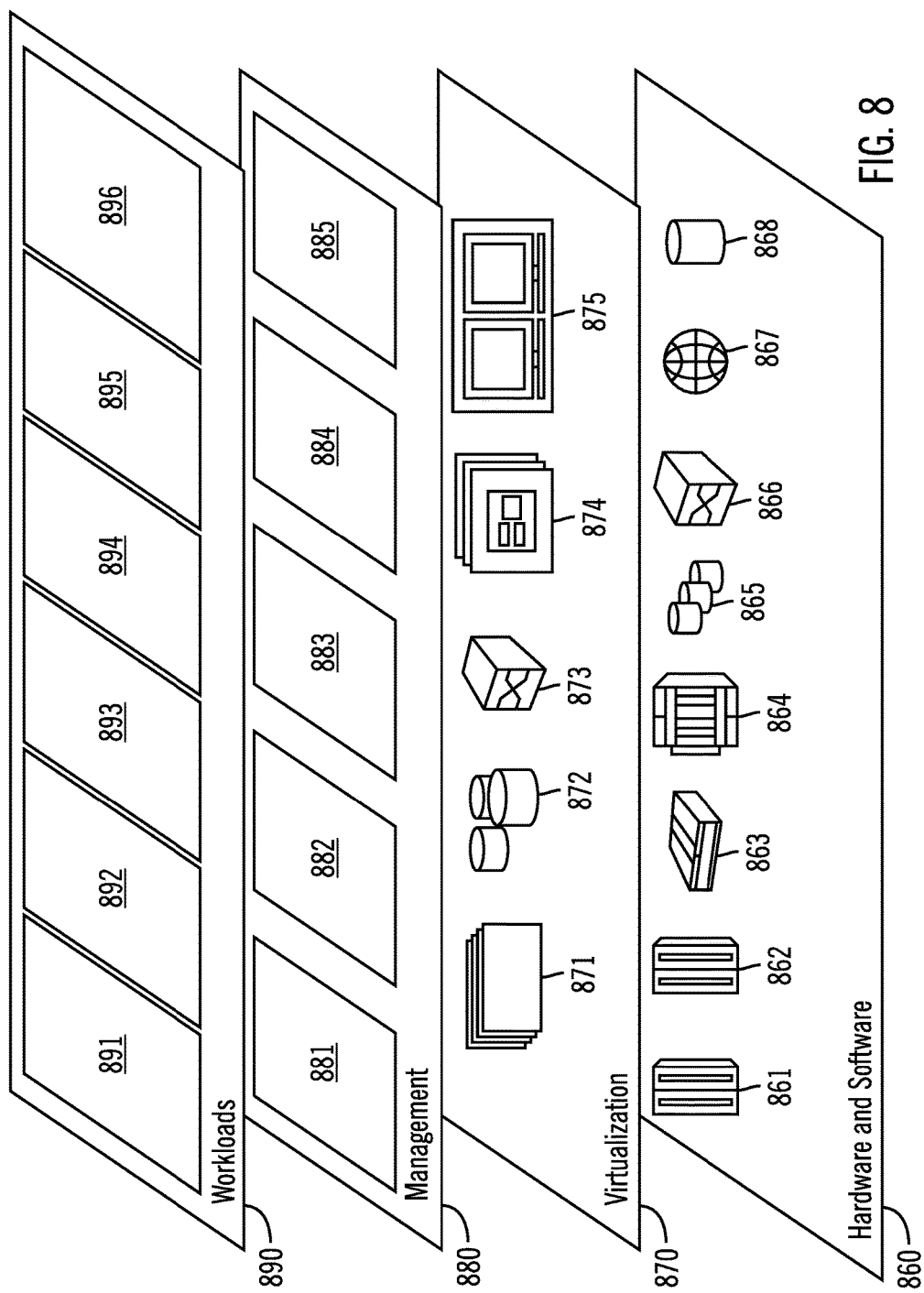
FIG. 8 illustrates abstraction model layers according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and concurrent Input/Output (I/O) enclosure firmware/Field-Programmable Gate Array (FPGA) update in a multi-node environment 896.

Thus, in certain embodiments, software or a program, implementing concurrent Input/Output (I/O) enclosure firmware/Field-Programmable Gate Array (FPGA) update in a multi-node environment in accordance with embodiments described herein, is provided as a service in a cloud infrastructure.

In certain embodiments, the server nodes 110, 120 and/or the computing system 200 are part of a cloud infrastructure.

In other embodiments, the server nodes 110, 120 and/or the computing system 200 are not part of a cloud infrastructure.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform:
    dividing a plurality of Input/Output (I/O) enclosures into a first set of I/O enclosures and a second set of I/O enclosures;
    performing concurrent code activation for the first set of I/O enclosures by:
        sending first notifications to each I/O enclosure management engine on each of a plurality of server nodes that code activation for the first set of I/O enclosures is starting, wherein errors that disrupt the code activation are ignored by each I/O enclosure management engine;
        activating an update image on the first set of I/O enclosures, wherein the update image contains a first image file for firmware and a second image file for a Field-Programmable Gate Array (FPGA), and wherein activating the update image updates at least one of the firmware and the FPGA; and
        sending second notifications to each I/O enclosure management engine on each of the plurality of server nodes that code activation for the first set of I/O enclosures has completed; and
    performing concurrent code activation for the second set of I/O enclosures.

2. The computer program product of claim 1, wherein the program code is executable by at least one processor to perform:
    performing high-level system pre-checks on the first set of I/O enclosures and the second set of I/O enclosures.

3. The computer program product of claim 1, wherein the program code is executable by at least one processor to perform:
    activating the update image on the second set of I/O enclosures.

4. The computer program product of claim 1, wherein an I/O enclosure management engine on a server node of the plurality of server nodes updates a flag for each of the first set of I/O enclosures based on receiving one of a first notification of the first notifications and a second notification of the second notifications.

5. The computer program product of claim 1, wherein the plurality of server nodes are coupled to a computing system storing a code load management engine, and wherein the plurality of server nodes and the computing system comprise nodes in a cloud infrastructure.

6. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more memories, to perform operations comprising:
    dividing a plurality of Input/Output (I/O) enclosures into a first set of I/O enclosures and a second set of I/O enclosures;
    performing concurrent code activation for the first set of I/O enclosures by:
        sending first notifications to each I/O enclosure management engine on each of a plurality of server nodes that code activation for the first set of I/O enclosures is starting, wherein errors that disrupt the code activation are ignored by each I/O enclosure management engine;

activating an update image on the first set of I/O enclosures, wherein the update image contains a first image file for firmware and a second image file for a Field-Programmable Gate Array (FPGA), and wherein activating the update image updates at least one of the firmware and the FPGA; and sending second notifications to each I/O enclosure management engine on each of the plurality of server nodes that code activation for the first set of I/O enclosures has completed; and performing concurrent code activation for the second set of I/O enclosures.

7. The computer system of claim 6, wherein the operations further comprise:

performing high-level system pre-checks on the first set of I/O enclosures and the second set of I/O enclosures.

8. The computer system of claim 7, wherein the operations further comprise:

activating the update image on the second set of I/O enclosures.

9. The computer system of claim 7, wherein an I/O enclosure management engine on a server node of the plurality of server nodes updates a flag for each of the first set of I/O enclosures based on receiving one of a first notification of the first notifications and a second notification of the second notifications.

10. The computer system of claim 7, wherein the plurality of server nodes are coupled to a computing system storing a code load management engine, and wherein the plurality of server nodes and the computing system comprise nodes in a cloud infrastructure.

11. A computer-implemented method, comprising:

dividing with a processor of a computing system, a plurality of Input/Output (I/O) enclosures into a first set of I/O enclosures and a second set of I/O enclosures;

performing, with the processor of the computing system, concurrent code activation for the first set of I/O enclosures by:

sending, with the processor of the computing system, first notifications to each I/O enclosure management engine on each of a plurality of server nodes that code activation for the first set of I/O enclosures is starting, wherein errors that disrupt the code activation are ignored by each I/O enclosure management engine;

activating, with the processor of the computing system, an update image on the first set of I/O enclosures, wherein the update image contains a first image file for firmware and a second image file for a Field-Programmable Gate Array (FPGA), and wherein activating the update image updates at least one of the firmware and the FPGA; and sending, with the processor of the computing system, second notifications to each I/O enclosure management engine on each of the plurality of server nodes that code activation for the first set of I/O enclosures has completed; and performing, with the processor of the computing system, concurrent code activation for the second set of I/O enclosures.

12. The computer-implemented method of claim 11, further comprising:

performing, with the processor of the computing system, high-level system pre-checks on the first set of I/O enclosures and the second set of I/O enclosures.

13. The computer-implemented method of claim 11, further comprising:

activating, with the processor of the computing system, the update image on the second set of I/O enclosures.

14. The computer-implemented method of claim 11, wherein an I/O enclosure management engine on a server node of the plurality of server nodes updates a flag for each of the first set of I/O enclosures based on receiving one of a first notification of the first notifications and a second notification of the second notifications.

15. The computer-implemented method of claim 11, wherein the plurality of server nodes are coupled to the computing system storing a code load management engine, and wherein the plurality of server nodes and the computing system comprise nodes in a cloud infrastructure.

* * * * *